United States Patent [19]
Avila et al.

[11] Patent Number: 5,802,353
[45] Date of Patent: Sep. 1, 1998

[54] HAPTIC COMPUTER MODELING SYSTEM

[75] Inventors: Ricardo Scott Avila; Lisa Marie Sobierajski, both of Niskayuna, N.Y.

[73] Assignee: General Electric Company, Schenectady, N.Y.

[21] Appl. No.: 662,544

[22] Filed: Jun. 12, 1996

[51] Int. Cl.⁶ .............................. G06F 9/455; G06F 19/00
[52] U.S. Cl. ............................................................ 395/500
[58] Field of Search ............................ 364/578; 395/500

[56] References Cited

U.S. PATENT DOCUMENTS

| | | | |
|---|---|---|---|
| 5,587,937 | 12/1996 | Massie et al. | 364/578 |
| 5,607,308 | 3/1997 | Copperman et al. | 434/62 |
| 5,623,582 | 4/1997 | Rosenberg | 395/99 |

OTHER PUBLICATIONS

"Project: Grope: Haptic Displays for Scientific Visualization", by F.P. Brooks, P.M. Ouh-Young, J.J. Batter, P.J. Kilpatrick, Proceedings of Siggraph '90, pp. 177–186 (Aug. 1990).

"The Nanomanipulator: A Virtual-Reality Interface for a Scanning Tunneling Microscope" by R.M. Taylor, W. RobineTt, V.L. Chi, F.P. Brooks, W.V. Wright, R.S. Williams, and E.J. Snyder, Proceedings of Siggraph '93, pp. 127–134 (Aug. 1993).

"Dynamic Force Feedback in a Virtual Knee Palpation", by G. Burdea, N. Langrana, K. Lange, D. Gomez, and S. Deshpande, Journal of Artificial Intelligence in Medicine, (1994).

"Volume Haptization" by Hiroo Iwata and Haruo Noma, Proceedings of IEEE Symposium on Research Frontiers in Virtual Reality– pp. 16–23, Oct. 1993.

*Primary Examiner*—Kevin J. Teska
*Assistant Examiner*—Ayni Mohamed
*Attorney, Agent, or Firm*—Lawrence P. Zale; Marvin Snyder

[57] ABSTRACT

A computer modeling and visualization system employs both 3D visual modeling and force feedback through a haptic device consistent with the visual display of the computer model. Force, or haptic, interaction is employed for exploring computer models. Point contact force equations were created for quickly computing forces directly from a model data which are provided to the haptic device, causing it to apply that force to an operator. The force equations employed are consistent with isosurface and volume rendering, providing a strong correspondence between visual and haptic rendering. The method not only offers the ability to see and feel the volumetric model but allows interactive modification and display of the model.

10 Claims, 4 Drawing Sheets

HAPTIC COMPUTER MODELING SYSTEM

BACKGROUND OF THE INVENTION

1. Field of the Invention

The present invention related to computer modeling.

2. Scope Of Related Prior Art

Computer models typically are shown visually to a user in which surfaces are displayed at desired locations and orientations. The user may interact with the model to cutaway, move and otherwise manipulate portions of the model. However, much of the this is done without the aid of tactile feedback.

Typically, when a sculptor is modifying or manipulating a physical model, there is force feedback. The computer model simulation lacks this element.

There has been some limited use of force, or haptic, feedback. In molecular docking studies, a robotic arm was used to supply molecular interaction forces as described in "Project GROPE: Haptic Displays for Scientific Visualization," by F. P. Brooks, P. M. Ouh-Young, J. J Batter, P. J. Kilpatrick, *Proceedings of SIGGRAPH '90*, pp. 177–186 (August 1990).

In another application, a haptic device was used as a nanomanipulator for a scanning tunneling microscope as described in "The Nanomanipulator: A Virtual-Reality Interface for a Scanning Tunneling Microscope" by R. M. Taylor, W. Robinett, V. L. Chi, F. P. Brooks, W. V. Wright, R. S. Williams, and E. J. Snyder, *Proceedings of SIGGRAPH '93*, pp. 127–134 (August 1993). This enabled scientists to manipulate individual atoms on a planar surface. This, however, was limited only to this specific use.

A medical planning and training system in "Dynamic Force Feedback in a Virtual Knee Palpation," by G. Burdea, N. Langrana, K. Lange, D. Gomez, and S. Deshpande, *Journal Of Artificial Intelligence in Medicine*, (1994), has also been developed which simulates knee palpation through the use of visual and haptic feedback. This system was specially designed for, and works only with knee palpation.

Currently there is a need to provide tactile feedback corresponding with a visual representation of a computer model to aid in model manipulation.

SUMMARY OF THE INVENTION

A computer model system starts with a volumetric dataset model. A visual representation is provided to an operator. The operator then employs a haptic device to "examine" the model. The haptic device(s) is monitored to determine its location. This location is equated to locations of the model. A scalar map of values, referred to as density values are employed in determining a normal force to an isosurface, and also viscous forces opposite the velocity of the haptic device. This creates the illusion of physically touching the model.

The operator may then select one of several "virtual tools" which can be used to modify the volumetric model. The model parameters in a small locality of the device are modified to create the illusion of melting, building-up, painting, air brushing, burning, stamping and other modifications to the model. The forces provided to the haptic device are also modified to be consistent with the visual representation and the volumetric model.

OBJECTS OF THE INVENTION

An object of the present invention is to provide a system which provides force feedback sensation to an operator consistent with a visual representation of the computer model.

Another object of the present invention is to provide a means for manipulating a three-dimensional volumetric model in which the user may visualize modifications and "feel" the model as it is being modified.

BRIEF DESCRIPTION OF THE DRAWINGS

While the novel features of the invention are set forth with particularity in the appended claims, the invention, both as to organization and content, will be better understood and appreciated, along with other objects and features thereof, from the following detailed description taken in conjunction with the drawings, in which:

DETAILED DESCRIPTION OF THE INVENTION

Figure 1:
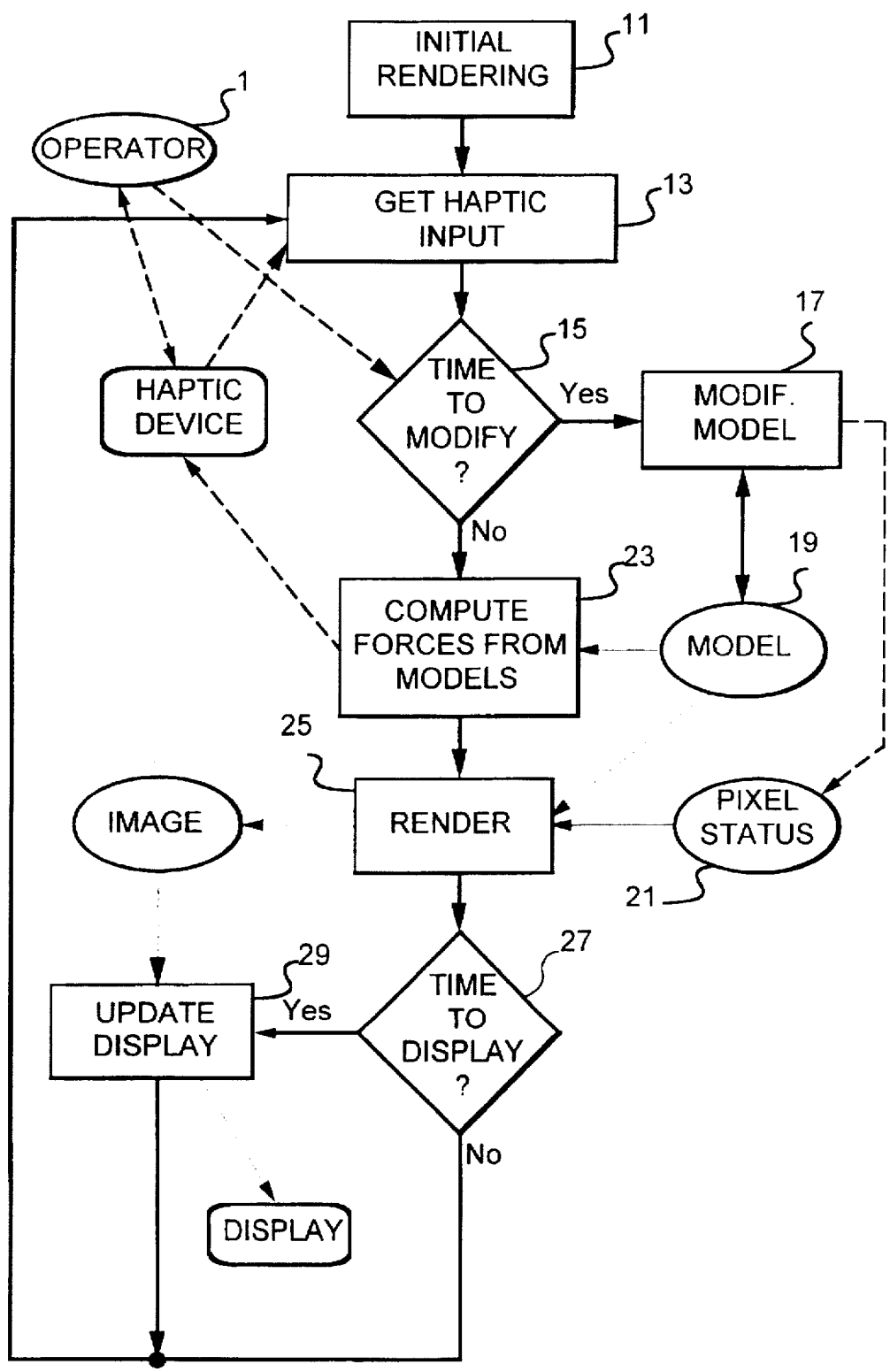
FIG. 1 is a simplified flowchart illustrating the functioning of the present invention.

A simplified flowchart of the functioning of the present invention is shown in FIG. 1. The haptic interaction loop begins in step 11 after an initial image of the scene has been computed and displayed. The next step in the interaction loop is to obtain the current position and orientation of a haptic pointer device operated by an operator 1 at step 13. The virtual counterpart of this physical pointer device will be referred to as a "tool", since it will often be used, for example, as a virtual scalpel, chisel, or paintbrush.

An operator may intend to modify the model in step 15. If necessary, the modification computation is performed in step 17, and the volume database is updated in step 19. In addition, the pixel status buffer is updated in step 21 to indicate which pixels of the image have been affected by this modification operation.

Once the optional modification step is complete, the current force is computed in step 23 and supplied to the haptic device.

During the rendering in step 25, some small number of pixels that require updating are rendered by conventional methods, such as a ray casting method.

Finally, in step 27, it is determined if it is time to refresh the physical display device. If so, the current image is copied to the screen and graphics hardware is used to render a geometric object in step 27 that indicates the size, position, and orientation of the current tool.

The data modification operation need not occur for every iteration of the haptic interaction loop. Instead, a timer may be employed indicating elapsed time since the previous modification. The main reason for limiting the rate at which data modification occurs is that in the preferred embodiment, a haptic refresh rate of 1 to 5 kHz is maintained. Therefore, there is only a small amount of computational time left over after the force calculation in each iteration. Increasing the rate of data modification would decrease the amount of time available to update the pixels of the image affected by the modification.

The rate at which the physical display device is refreshed is also limited by an elapsed time threshold. In the case, the limit is imposed since refresh rates much greater than 30 Hz are unnecessary.

Each voxel of the volumetric data set represents some properties of the data in the small three-dimensional region surrounding that voxel. Typically, volumetric data consists of scalar values representing material density, from which a gradient direction and magnitude can be computed. Shading properties such as color and ambient, diffuse, and specular lighting coefficients may also be stored in each voxel. A voxel may contain additional material properties such as stiffness and viscosity.

Example data which could be used to represent a voxel of the computer model are shown in Table 1. In this example, a single index value is used to represent several material properties through the use of a look-up table. This reduces the amount of computer memory required to store the model, but requires all properties derived from the look-up table to be modified simultaneously.

TABLE 1

| Property | Type | Size (bytes) |
|---|---|---|
| Density | Scalar | 1 |
| Gradient Direction | Encoded Unit Vector | 2 |
| Gradient Magnitude | Scalar | 1 |
| Color | R,G,B | 3 |
| Material Properties | Look-up Table Index | 1 |

The force equations are based on two principal requirements. First, the interaction forces must be calculated fast enough to be used within an interactive system. Second, the forces imparted to the user should be consistent with the rendering of the volumetric object.

Figure 2:
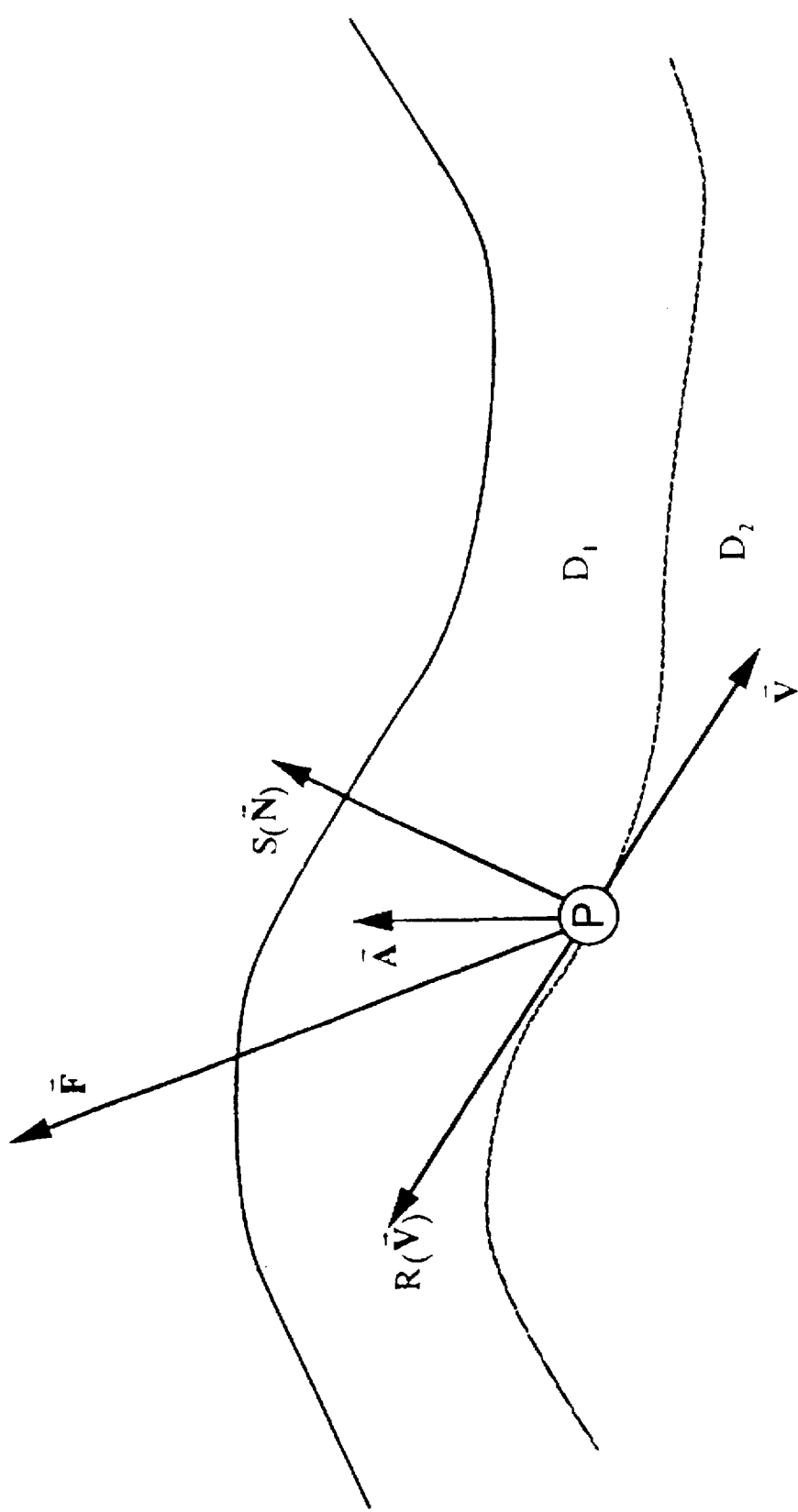
FIG. 2 is a diagram of the forces being simulated.

In order to meet the speed requirement and since the haptic device used in the present implementation could only handle translation forces, the force calculation is simplified to a point contact. This has been shown to be a reasonable simplification for many tasks. The general equation used for feeling an object using a point contact model is:

$$\vec{F} = \vec{A} + R(\vec{V}) + S(\vec{N}) \quad (1)$$

and is illustrated in FIG. 2. The force $\vec{F}$ supplied to operator 1 located at position P and moving in direction $\vec{V}$ is equal to the vector sum of an ambient force $\vec{A}$, a motion retarding force $R(\vec{V})$, and a stiffness force $S(\vec{N})$ normal to object $D_2$ which is inside object $D_1$. The ambient force $\vec{A}$ is the sum of all global forces acting on the tool, such as a gravitational or buoyant force. The motion retarding force is proportional to velocity and can be used to represent a viscous force. The last term captures the stiffness of the object and is always in the direction of the gradient. When simulating interaction on rigid surfaces, which are generally governed by Hooke's law, this term can then be set to a linear force function in the direction of the surface normal and proportional to the penetration distance of point P.

This general equation for force feedback is the basis for calculating forces which are consistent with different types of rendering methods.

The display of volume data may require segmentation of a volume into its parts. In a similar manner, a segmentation step which produces force feedback properties to the model may also be employed.

In Table 1, please notice that the material properties take into account both viscous and stiffness forces.

While it is possible to precompute distance to an isosurface for every voxel in the volume, it was decided to investigate techniques for approximating stiffness and retarding forces based only on the density field. There are two reasons for this. First, the system allows for the interactive modification of the volume. Creating a new distance map for the volume would be prohibitive. Second, for small penetration distances, the density field itself can give a reasonable approximation of the distance to an isosurface. Similar to volume rendering, the retarding and stiffness force functions used to feel an isosurface become dependent on transfer functions:

$$R(\vec{V}) = -Vf_r(d) \quad (2)$$

$$S(\vec{N}) = \frac{\vec{N}}{|\vec{N}|} f_s(d) \quad (3)$$

Here the density d is used as an indicator of penetration distance between the isosurface density values $d_i$ and $d_j$, where $d_i < d_j$. The function $f_r(d)$ maps density values into retarding force magnitudes while $f_s(d)$ maps density value into stiffness force magnitudes. For example, these transfer functions may be:

$$f_r(d) = \begin{cases} E(d - d_i) + F & (\text{for } d_i < d \geq d_j) \\ 0 & \text{Otherwise} \end{cases} \quad (4)$$

$$f_s(d) = \begin{cases} G \frac{(d - d_i)}{d_j - d_i} & (\text{for } d_i < d \geq d_j) \\ 0 & \text{Otherwise} \end{cases} \quad (5)$$

The retarding force $f_r(d)$ is set to a linear function proportional to the difference in density above $d_i$. Similar to haptic volume rendering, the coefficients E, F, and G specify a linear mapping from density values to force magnitudes.

The stiffness force $f_s(d)$ varies from zero to G depending linearly on where the value d lies between $d_i$ and $d_j$. This can be viewed as a penetrable shell model with viscous internal properties. A nice property of this model is that it allows the user to feel subsurface structure since the density and normal vector may change below the surface. Many other operator-selected transfer functions may be used.

To aid the user during volume modification, synthetic guide forces can be applied. For example, a virtual plane perpendicular to a surface can be used as a guide when attempting to cut a straight line.

The data modification component of this haptic visualization method is an optional component that can be used to modify any local property of the data stored in the volume database. A local property is one that affects only a small region of the volume, and therefore will cause only a small region of the image to require updating. All properties represented by a value stored in each voxel are local properties of the model. Values which are derived through the use of a look-up table represent dependent properties that cannot be modified independently. For example, if opacity is derived from a look-up table indexed by material density, it cannot be modified using this method since any change to the look-up table could potentially result in wide spread changes in the model. The index value itself could be modified, thereby modifying all properties that are derived from the look-up table. If opacity is instead stored in each voxel, then this is a local property that can be modified with this method.

Local data properties can be modified by setting them to a constant value, or by applying a filter to the current values. With the constant value method, the current color value in each voxel that the tool encounters could be replaced by some constant color value in order to "paint" the object.

With the filter method, an object could be "melted" by updating density values in a small region around the tool location according to $d_i=(1-\alpha)d_{i-1}$, where $d_i$ is the new density value, $d_{i-1}$ is the current density value, and $\alpha$ is obtained by sampling a spherical filter with a Gaussian distribution centered at the tool location.

In contrast to melting, an object can be "constructed" using, $d_i=\alpha D+(1-\alpha)d_{i-1}$ where D is the density of the material that we are adding to the volume. Note that melting is just a special case of constructing with D=0. In fact, constructing will appear like melting whenever the opacity of $d_i$ is less than the opacity of the $d_{i-1}$ that it is replacing.

The two modification methods described above can lead to a wide variety of tools by varying the constant value or filter type, and the data properties that are modified. In the present system, a modification operation is defined by providing the modification method, the extent of modification, the properties affected, and any necessary filter and constant values. A tool is composed of one or more modification operations, with the condition that no property is affected by more than one modification operation in a tool.

Figure 3:
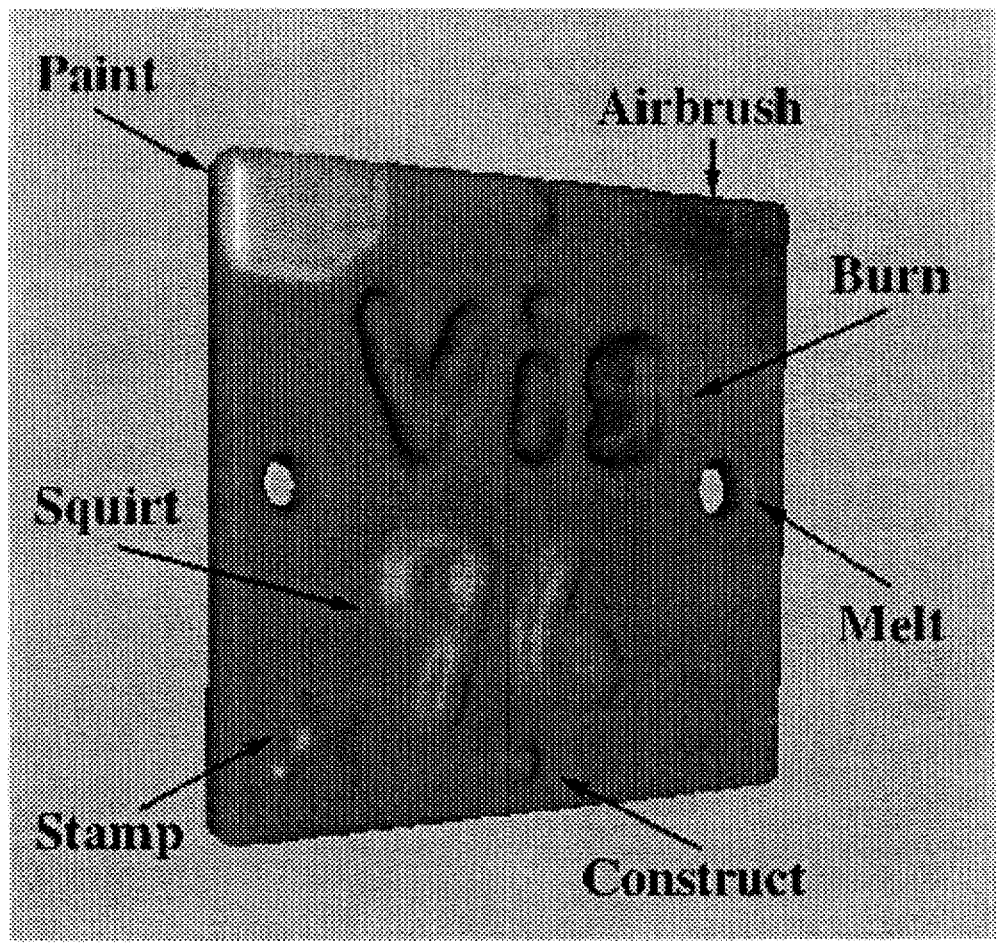
FIG. 3 illustrates the use of some model modification tools on a volumetric wall.

FIG. 3 illustrates the use of some model modification tools on a volumetric wall. These tools are described briefly in Table 2, where the first column indicates a tool name, the second column lists the modification method used for each operation, the third column defines the properties that are modified for each operation, and the last column describes the modification process. Specific constants for the instance of the tools shown in FIG. 2 are given in parenthesis in the last column.

TABLE 2

| Tool Name | Method | Property Affected | Description (example) |
|---|---|---|---|
| Melt | Filter | Density | remove density |
| Construct | Filter | Density | add density (63% dense) |
| Burn | Filter | Density | remove density |
|  | Filter | Color | blend in black |
| Squirt | Filter | Density | add density (63% dense) |
|  | Filter | Color | add color |
| Stamp | Filter | Density | add shape (cross-hair filter) |
|  | Filter | Color | add color (green) |
|  | Constant | Index | set material (shiny) |
| Paint | Constant |  | set color (yellow) |
|  | Constant |  | set material (shiny) |
| Airbrush | Filter | Color | blend color (purple) |
|  | Constant | Index | set material (dull) |

Figure 4:
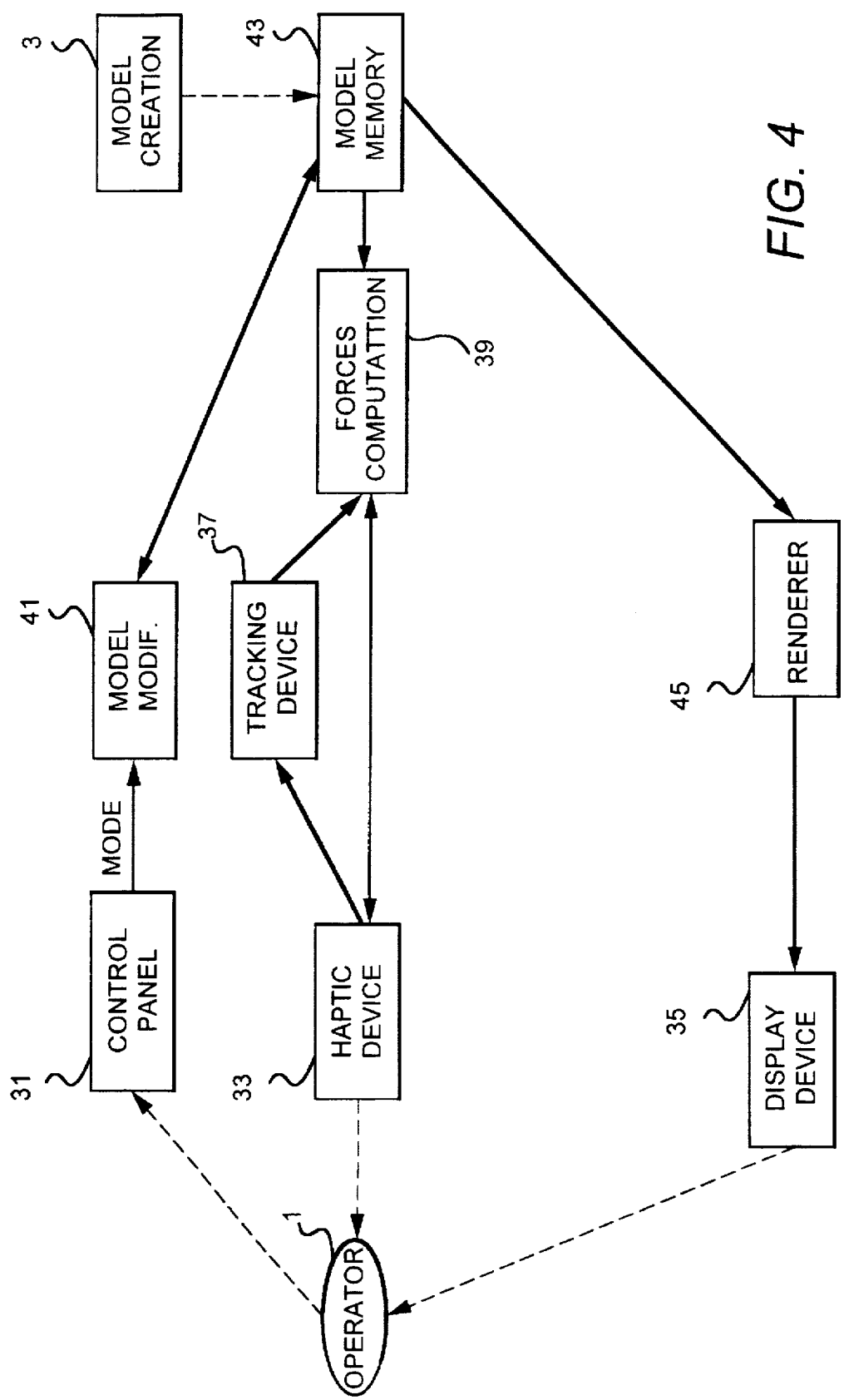
FIG. 4 is a simplified block diagram of a computer modeling system according to the present invention.

In FIG. 4 a computer modeling system according to the present invention is shown. Operator 1 interacts with a haptic device 33, a control panel 31 and a display device 35. The display device may be any apparatus which can display two-dimensional images and computer models to operator 1. The control panel may be any conventional input device used for providing information to a computer system, or may be the haptic device itself.

The haptic device may be an input/output type device such as a "pencil-like" segment which operator 1 holds, connected to a series of arm segments in which the segments are connected to each other to make a continuous mechanical arm. Each segment meets at a joint which has both a sensor for determining the angular position of the joint, and a motor for causing a feedback force to be applied between the arm segments, and ultimately to the operator. A tip of a "pencil-like" arm segment of a haptic device 33 may be used as the functional point at which forces are computed and modifications are made.

A computer model is created by a model creation device 3 and provided to model memory 43. Optionally, model memory may receive a computer model in its final form and have it prestored. A tracking device 37 (which may alternatively be provided by haptic device 33) monitors sensors of haptic device 33 to determine a location of a desired point of haptic device 33. Typically the point monitored would be the end of the "pencil-like" arm segments of haptic device 33.

A force computation device 39 is connected to tracking device 37 and model memory 43. Force computation device 39 receives the information from tracking device 37 to determine the location of the functional point of the haptic device. When this point has a location which intersects the model stored in model memory 43, force computation device provides a force value to haptic device 33 causing haptic device 33 to exert that amount of force in the specified direction against operator 1. This gives the illusion to operator 1 that the tip is hitting the model.

Model memory has stored densities which represent stiffness and viscosity coefficients for different locations of the model to simulate different materials. For example, a very high stiffness force and a low viscosity force would simulate ice and conversely a very low stiffness force and a high viscosity would simulate a putty-like object.

A renderer 45 reads the graphics information from model memory 43 and provides this information to a display device 35. Display device 35 then displays model surfaces, and optionally the haptic device in correct relation to those model surfaces which is correctly associated with the forces experienced by operator 1 from haptic device 33. This provides the illusion through both sight and touch of actually interacting with the virtual model.

Not only is it possible to interact with, feel, and visualize the model, but when operator 1 interacts with control panel 31, a mode may be selected in which the model may be modified and forces computed and images rendered according to the modified model. The modes determined by a control panel 31 may allow operator 1, using haptic device 33 to cut away, burn, melt, build up, pull, or push portions of the model in the vicinity of the tip of pencil-like arm of haptic device 33.

Based on the mode selected by operator 1 through control panel 31, a model modification device 41 modifies parameters of the model consistent with the mode and location of haptic device 33. Examples of possible modifications which may be made to the model are described later.

The present invention provides force feedback based upon the characteristics of the model itself, however, the present invention does not have to be limited to only non-moving objects. The present invention, with proper force calculations, may also provide force feedback for interaction with moving objects. For instance, haptic device 33 may be used to collide with, or "hit" an object causing the object to move to a different location. This may provide feedback such as a "feel" of hitting an object which may be possibly moving when it is hit. The material of the object may also be taken into account along with the motion and momentum of the object in order to have the object crush or deform as it is hit and/or moved in a direction. In the instance of a collision, an inertial force is also computed and added to the other existing forces to produce the resultant force.

The more processing and the more complex the calculations, the more processing power is required which may become restrictive. Theoretically, however, it is possible to determine, and provide this force and visual feedback of moving bodies.

While specific embodiments of the invention have been illustrated and described herein, it is realized that modifications and changes will occur to those skilled in the art. It is therefore to be understood that the appended claims are intended to cover all such modification and changes as fall within the true spirit and scope of the invention.

What is claimed is:

1. A haptic computer modeling system comprising:
   a) a movable haptic input/output ("I/O") device capable of providing force feedback to an operator:
   b) tracking device coupled to the haptic I/O device for tracking the position of at least one point on the haptic I/O device;
   c) a model memory for storing information defining structure and properties of a computer model;
   d) a force computation device coupled to the tracking device model memory and haptic I/O device capable of reading the location of the haptic I/O device and the computer model and for computing a feedback force based upon the location of the haptic I/O device relative to portions of the computer model and causing the haptic I/O device to provide the feedback force to the operator; and
   e) a control panel for providing an operator/selected mode; and
   f) a model modification device coupled to the control panel, the model memory and the tracking device for modifying parameters of the computer model at the location of the I/O device according to the mode received from the control panel.

2. The haptic computer modeling system of claim 1 wherein the force computation device receives density information d indicating penetration distance model memory at the current location of the I/O device and determines a retarding force $f_r$ dependent upon the velocity of the haptic I/O device and a viscosity of the material at the current location within the model, and a stiffness force $f_s$ dependent upon the characteristics of the model material as a function of density d.

3. A method of performing computer modeling on a volumetric model having a plurality of density values d, comprising the steps of:
   a) providing a 3D visual image of a portion of the volume model;
   b) reading current location of a functional point on an operator-manipulated haptic input/output device;
   c) converting location of haptic device to corresponding location density d within the volume model;
   d) determining a stiffness force $f_s(d)$ and a viscous force, $f_r(d)$ from the density value d; and
   e) providing forces $f_s(d)$ and $f_r(d)$ to an operator through the haptic device creating the illusion of physically interacting with a material having specific and defined material characteristics.

4. The method of claim 3 further comprising the steps of:
   a) selecting modification mode through a control panel;
   b) altering parameters of the volume model near the location of haptic device to change the shape, color, or texture of the volumetric model;
   c) altering the forces to the haptic device to simulate changes incurred by the model; and
   d) updating the 3D visual image to correspond to the altered model.

5. A method for interacting with a 3D computer model having a plurality of properties each identified at a location comprising steps of:
   a) rendering the computer model from an initial viewpoint;
   b) monitoring the position of a functional point of a haptic device capable of providing force feedback to an operator;
   c) modifying the properties of the computer model based upon an operator-specified modification mode;
   d) computing a force from the position of the functional point relative to the computer model;
   e) applying the computed force to the operator through the haptic device; and
   f) rendering at least a portion of the modified computer model to the operator.

6. The method of method for interacting with a 3D computer model of claim 5 wherein the step of modifying the properties of the computer model comprising the steps of:
   a) receiving a modification mode from the operator defining which model properties to modify, and how they are to be modified; and
   b) modifying the model properties at a predetermined region around the monitored functional point.

7. The method of interacting with a 3D computer model of claim 5 wherein the step of rendering at least a portion of the modified computer model comprising steps of:
   a) determining image pixels affected by model modification;
   b) indicating the affected pixels; and
   c) updating the indicated pixels with the modified model.

8. The method of interacting with a 3D computer model of claim 5 wherein the step of computing a force comprises the steps of:
   a) computing a velocity of the functional point relative to the model;
   b) determining a resistive force $f_r$ from the velocity;
   c) determining a stiffness force $f_s$ from the density values; and
   d) determining a resultant force to be used as the computed force in step 6e from the resistive force $f_r$, and the stiffness force $f_s$.

9. The method of interacting with a 3D computer model of claim 8 further comprising the step of:
   a) measuring a velocity of a model object;
   b) determining an inertial force from a relative velocity between the functional point and the model object when they interact;
   c) adding the inertial force to the resultant force as the computed force in step 6e when they interact.

10. A method for creating a 3D computer model having a plurality of properties each identified at a location comprising steps of:
    a) monitoring the position of a functional point of a haptic device capable of providing force feedback to an operator;
    b) defining properties at the functional point of the haptic device to construct structures of the model;
    c) computing a force consistent with material type and haptic I/O device velocity, from the position and velocity of the functional point relative to structures of the computer model;
    d) applying the computed force to the operator through the haptic device; and
    e) rendering at least a portion of the constructed computer model to the operator.

* * * * *